United States Patent
Ananthachar et al.

(10) Patent No.: US 7,338,986 B2
(45) Date of Patent: Mar. 4, 2008

(54) UV CURABLE LOW GLOSS ADDITIVES FOR OVERPRINT VARNISH COATING FORMULATIONS AND COATINGS THEREFROM

(75) Inventors: Sudhir Ananthachar, Parsippany, NJ (US); Andrew A. Romano, Sparta, NJ (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 10/963,420

(22) Filed: Oct. 12, 2004

(65) Prior Publication Data

US 2005/0107509 A1    May 19, 2005

(51) Int. Cl.
*C08F 2/46* (2006.01)
*C08F 2/50* (2006.01)

(52) U.S. Cl. .................... 522/178; 522/181; 522/182; 522/183; 522/173; 522/176; 522/78; 522/74; 522/150; 522/151; 522/153; 522/134; 522/135; 522/142; 522/144; 428/474.4; 428/500

(58) Field of Classification Search .................. 522/78, 522/74, 182, 183, 178, 179, 150, 151, 153, 522/134, 135, 142, 144; 428/474.4, 500
See application file for complete search history.

(56) References Cited

U.S. PATENT DOCUMENTS

| | | | |
|---|---|---|---|
| 6,855,796 B2 * | 2/2005 | Lachowicz et al. | 528/220 |
| 2003/0195317 A1 * | 10/2003 | Lachowicz et al. | 526/312 |
| 2005/0027082 A1 * | 2/2005 | Narayan-Sarathy et al. | 525/471 |
| 2005/0107487 A1 * | 5/2005 | Lachowicz et al. | 522/6 |
| 2005/0261391 A1 * | 11/2005 | Narayan-Sarathy et al. | 522/173 |

* cited by examiner

*Primary Examiner*—Sanza L. McClendon
(74) *Attorney, Agent, or Firm*—Martin Connaughton

(57) ABSTRACT

The invention relates to UV curable, low gloss overprint varnish coating formulations and cured coatings prepared therefrom. The low gloss overprint varnish formulations contain a Michael addition resin, a polyamide powder and a reactive monomer.

12 Claims, No Drawings

UV CURABLE LOW GLOSS ADDITIVES FOR OVERPRINT VARNISH COATING FORMULATIONS AND COATINGS THEREFROM

BACKGROUND OF THE INVENTION

The present invention relates to low gloss (matte) additives for use in UV curable overprint varnish coatings applicable to various printing ink applications such as flexographic, screen and offset. More particularly, the present invention relates to UV curable low gloss overprint coating compositions containing a low gloss additive comprising polyamide polymers and a liquid, uncured, Michael addition resin and the cured coatings therefrom. The coatings of the present invention are UV curable with reduced levels of photoinitiator when compared with traditional UV curable, acrylate, low gloss overprint systems.

UV curable acrylate coatings(overprint varnishes) are 100% solids. These types of coatings inherently form a coating that has a high gloss. It is difficult to obtain a low gloss cured coating from UV curable acrylate compositions. Traditional low gloss or matte UV curable acrylate overprint varnish formulations use inorganic materials such as silica dispersed in acrylate monomers to reduce gloss and obtain matte finishes. Disadvantages of these systems include the use of high levels of photoinitiator to obtain a cured system under standard curing conditions (300 mj/cm$^2$). The use of high levels of photoinitiators yield a high gloss finished product. There are also viscosity problems caused in part from using silica as a low gloss additive. A silica containing overprint system's application viscosity is difficult to control. It is not uncommon for resultant problems to generate batch rejection rates of 30% to 40% and raw material overruns of 20% to 30%.

Attempts to address the problems related to high gloss and application viscosity have been made by formulating an overprint varnish containing polyamides as a low gloss additive dispersed in a mixture of acrylates. Although the viscosity problem for the most part was obviated by substituting polyamide powders for silica in UV curable acrylate systems the gloss problem associated with the presence of relatively large amounts of photoinitiators still remained.

According to the invention it was found that the gloss problem attributable to the presence of relatively large amounts of photoinitiator could be solved without affecting improvements in viscosity by using a low gloss additive combination comprising dispersions of polyamides in a UV curable acrylate overprint varnish formulation in conjunction with liquid, uncured Michael addition resins. The polyamide and liquid, uncured Michael addition resin are added to overprint varnish coating formulations where a low gloss finish is desired in the cured coating. The amount of external photoinitiator in an overprint formulation can be significantly reduced by using the Michael addition resin technology described in U.S. Pat. Nos. 5,945,489 and 6,025,410 both assigned to Ashland Inc. and the contents of which are incorporated by reference herein in their entirety. Because the above referenced Michael addition resins are UV curable at typical UV curing conditions (<300 mj/cm$^2$) with little or no photoinitiator, the amount of photoinitiator overall in the overprint varnish formulations is significantly reduced when compared to previous UV curable acrylate, low gloss, overprint varnish formulations.

SUMMARY OF THE INVENTION

The present invention provides UV curable, low gloss additives and an overprint varnish coating formulations containing the low gloss additives comprising a dispersion of a polyamide dispersed in a UV curable acrylate overprint varnish coating formulation containing a liquid, uncured, Michael addition resin. The overprint varnish coating formulation can be cured under typical UV curing conditions (<300 mj/cm$^2$) with greatly reduced levels of photoinitiator. When cured the varnish overprint composition forms a low gloss coating.

DETAILED DESCRIPTION OF THE INVENTION

The present invention provides a low gloss additive comprising the combination of a polyamide and a liquid, uncured Michael addition resin, an overprint varnish coating formulation containing the low gloss additive and cured coatings derived therefrom. Preferably, the polyamide is dispersed in the liquid uncured Michael addition resin and the dispersion is then added to the overprint varnish coating formulation.

In addition to the polyamide dispersion the overprint varnish coating formulation can contain other components typically used in UV curable coatings including UV curable acrylate monomers, photoinitiator(s), viscosity modifiers, flow and leveling aids, finish and mar resistance enhancers, defoamers, etc.

The polyamides used in the low gloss additive are fine powdered polymers and copolymers of lauryllactame and/or caprolactame obtained by direct polymerization. The polyamide polymers are available in a variety of different particle sizes and surface area. Examples of various polyamides and their physical characteristics include 2001 EXD polyamide 12, having an average particle size of 12 microns and a specific surface area of 4 m$^2$/g; 2001 UD polyamide 12, having an average particle size of 5 microns and a specific surface area of 9 m$^2$/g; and 3501 EXD copolyamide 6/12, having an average particle size of 10 microns and a specific surface area of 20 m$^2$/g. The polyamide powder is present in the overprint varnish in amounts of from about 1.5 wt % to about 9 wt %, preferably from about 3 wt % to about 9 wt %, based on the total weight of the overprint varnish composition. The liquid, uncured Michael addition resin is a polyacrylate oligomer formed from a multifunctional acrylate Michael acceptor and a β-dicarbonyl Michael donor. The β-dicarbonyl Michael donor is suitably chosen from among β-keto esters, β-diketones, β-ketoamides, and β-ketoanilides. The multifunctional acrylate Michael acceptor is suitably chosen from among diacrylates, triacrylates, and tetraacrylates. The range of β-dicarbonyl donors and multifunctional acrylate acceptors affords the composition designer the opportunity to exercise a great range of selectivity in the properties of the final product. The Michael addition resin is present in amounts of from about 10 wt % to about 90 wt %; from about 15 wt % to about 70 wt % or from about 15 wt % to about 50 wt % based on the total weight of the overprint varnish formulation.

Preferred diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, epoxy diacrylate, aryl urethane diacrylate, aliphatic urethane diacrylate, polyester diacrylate, and mixtures thereof.

Preferred triacrylates include, but are not limited to: trimethylol propane triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Preferred tetraacrylates include, but are not limited to: di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, polyester tetraacrylates, melamine tetraacrylates, epoxy novolac tetraacrylates, and mixtures thereof.

In a preferred embodiment, the β-dicarbonyl Michael donor is a β-diketone (e.g., 2,4-pentanedione). Suitably, the present invention may also be practiced with a β-ketoester (e.g., ethyl acetoacetate), a β-ketoanilide (e.g., acetoacetanilide) or a β-ketoamide (e.g., acetoacetamide) or a mixture of Michael donors according to the desired resin quality.

Suitable β-dicarbonyl donor compounds having functionality of 2 include, but are not limited to: ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxyethyl methacrylate, allyl acetoacetate, benzyl acetoacetate, 2, 4-pentanedione, isobutyl acetoacetate, and 2-methoxyethyl acetoacetate.

Suitable β-dicarbonyl donor compounds having functionality of 4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality of 6 include, but are not limited to: trimethylol propane triacetoacetate, glycerin triacetoacetate, and polycaprolactone triacetoacetates.

A preferred, but not limiting, β-dicarbonyl donor compound having functionality of 8, is pentaerythritol tetraacetoacetate.

The Michael addition reaction is catalyzed by a strong base. A preferred base is diazabicycloundecene (DBU), which is sufficiently strong and is readily soluble in the monomer mixtures. Other cyclic amidines, for example diazabicyclo-nonene (DBN) and guanidines are also suitable for catalyzing this polymerization. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. Finally, strong, organophilic alkoxide bases can be generated in situ from the reaction between a halide anion (e.g., quaternary halide) and an epoxide moiety. Such in situ catalysts are disclosed in pending application Ser. No. 10/255,541 assigned to Ashland, Inc., the assignee of the present application. The entire contents of application Ser. No. 10/255,541 is specifically incorporated by reference in its entirety and for all purposes.

In the present invention the β-dicarbonyl Michael donor and/or Michael acceptors can be modified to contain pendant Type I α-cleavage(e.g., substituted benzoins, benzyl ketals, or acetophenones) or Type II H-abstraction (e.g., substituted benzophenones, thioxanthones, camphorquinones or bisimidazoles) photo-labile moieties. The resulting liquid, uncrosslinked Michael addition resins possess either or both Type I and Type II photo-labile free radical generating functional groups that promote the addition polymerization of acrylic groups upon exposure to UV light. These modified resins are disclosed in U.S. Ser. No. 60/564,026 filed on Apr. 21, 2004 the contents of which are incorporated herein by reference.

Examples of acrylates useful in UV curable overprint varnish coating formulations include those acrylates disclosed above for use in the preparation of liquid, uncured Michael addition resins. Typically, acrylates are present in amounts of from about 5 wt % to about 70 wt % based on the total weight of the overprint varnish coating formulation. Preferably acrylates are present in amounts of from about 10 wt % to 70 wt % or from about 30 wt % to about 70 wt %. An example of a suitable acrylate is ethoxylated trimethylolpropane triacrylate. The acrylates are useful for adjusting viscosity of the uncured overprint varnish and manipulating the final crosslink density of the cured coating.

Any of the known photoinitiators used in UV curing of acrylates can be used in the present invention. For example, benzophenone, either alone or in conjunction with other photoinitiators such as Igacure 184 can be used. Photoinitiator when used in the present invention is present in amounts typically from 50% to 75% lower than traditional UV cure acrylate systems that do not use liquid, uncured Michael addition resins. Photoinitiator is present in the OPV in amounts of from 0 wt % to about 3 wt %, preferably from 0 wt % to about 1.5 wt % based on the total weight of the OPV.

Photoactivators/synergists can be added to the overprint varnish coating formulation to enhance the reactivity of the formulation. Examples of suitable synergists include amines such as 2-amino-2-methyl-1-propanol (AMP-95) and amine modified acrylates such as CN-386 available from Cray Valley. The photoactivator/synergists are present in the overprint varnish coating formulation in amounts of from 0 to about 10 wt % based on the total weight of the over print varnish coating formulation. Preferably the synergist is present in amounts of from about 2 wt % to about 3 wt %. Other additives include flow and level aids such as DREW-FAX 860, a modified polysiloxane present in amounts from 0 to about 10 wt %, preferably from about 1.5 wt % to about 3.0 wt %. Finish enhancers such as Shamrock S381-N1. A polyethylene wax is present in amounts of from 0 to about 10 wt % based on the total weight of the overprint varnish coating formulation. Preferably the finish enhancer is present in amounts of from about 2 wt % to about 5 wt %.

The present inventions are useful in any application that requires a UV curable, acrylate, low gloss overprint varnish coating.

In the following examples all amounts are given in weight percent unless otherwise indicated. Viscosity was measured according to ASTM D4212 (Book 6.01) using a number 3

Zahn cup. Gloss was measured according to ASTM D 523-89 at 60°. Cure Response was measured by the scratch test. A cured coating is scratched with a sharp object. If a powder forms from the scratch the coating is considered to be cured and the rating is "good"

EXAMPLE 1

UV Curable Low Gloss Additive Mixed with an Acrylate (Ethoxylated TMPTA)

TABLE 1

| Raw Material | Description | w/w % |
|---|---|---|
| Michael Resin | 0.85 HDDA/0.10CN-116 0.05TMPTA/EAA2.6/0.20 piperidine | 59% |
| Orgasol 2001 EXD NAT | Polyamide powder | 30% |
| SR-454 | Ethoxylated TMPTA | 11% |

The amounts given for individual components of the uncured, liquid Michael addition resin under "Description" are give as moles.

HDDA-1,6-hexandiol Diacrylate

CN-1,6-a Low Viscosity Ethoxylated Diacrylate from Sartomer

TMPTA-trimethylolpropane, Triacrylate

EAA-ethylacetoacetate

Orgasol 2001 EXD NAT is a polyamide polymer powder available commercially from Atofina.

The Michael resin was added to a steel container with stirring. The polyamide powder was added slowly with mixing until the addition was complete. The ethoxylated TMPTA was added and stirring increased to 5000 RPM. The low gloss additive and ethoxylated TMPTA was mixed until it was a homogeneous dispersion, about 30 minutes.

EXAMPLE 2

An Overprint Varnish Formulation with no Low Gloss Agent

TABLE 2

| Raw Material | Description | Parts (w/w) |
|---|---|---|
| Michael Resin | 0.85HDDA/0.10 CN-116/0.05TMPTA/EAA 2.6/0.20 Piperidine | 22 |
| SR-454 | Ethoxylated TMPTA | 67.5 |
| Benzophenone | Photoinitiator | 5 |
| AMP-95 | 2-Amino-2methyl-1propanol | 2 |
| Drewfax 860 | Flow and leveling aid | 1 |
| Shamrock S381-N1 | Polyethylene Wax | 2.5 |
| | Total | 100 |
| #3 Zahn Viscosity | 18 seconds | |
| 60° Gloss (Paper) | 94.5 | |

The Michael resin from example 1 was added to a steel container followed by the SR-454 and mixed for 10 minutes at 200 RPM. Benzophenone was added and mixed until all the Benzophenone dissolved. AMP-95 was added and mixed 5 minutes. DREWFAX 860 and Shamrock S381-N1 Polyethylene wax were added sequentially and mixed for 20 minutes at 500 RPM. After mixing was completed the viscosity of the formulation was measured. A sample of the formulation was taken and drawndown on a Leneta 1B chart and passed through a Fusion UV curing apparatus to cure. After curing 60 Degree gloss was measured and recorded.

EXAMPLE 3

An Overprint Varnish Coating Formulation with Silica as a Low Gloss Agent

TABLE 3

| Raw Material | Description | Parts (w/w) |
|---|---|---|
| Michael resin | 0.85HDDA/0.10 CN-116/0.05TMPTA/EAA 2.6/0.20 Piperidine | 19 |
| SR-454 | Ethoxylated TMPTA | 60.5 |
| Benzophenone | Photoinitiator | 5 |
| AMP-95 | 2-Amino-2methyl-1propanol | 2 |
| Drewfax 860 | Flow and leveling aid | 1 |
| OK 412 | Silica | 10 |
| Shamrock S381-N1 | Polyethylene wax | 2.5 |
| | Total | 100 |
| #3 Zahn Viscosity | 90 seconds | |
| 60° Gloss (Paper) | 48 | |

The formulation was prepared as in example 2 except prior to adding the polyethylene wax, silica was added and mixed for 5 minutes at 500 RPM.

EXAMPLE 4

An Overprint Varnish Coating Formulation with a Polyamide Dispersed in an Uncured Liquid Michael Addition Resin

TABLE 4

| Raw Material | Description | Parts (w/w) |
|---|---|---|
| Low Gloss Additive | 58% - Michael resin 30% - Orgasol 2001 EXD Nat 12% - SR-454 | 33 |
| SR-454 | Ethoxylated TMPTA | 59 |
| Benzophenone | Photoinitiator | 2.5 |
| AMP-95 | 2-Amino-2methyl-1propanol | 2 |
| Drewfax 860 | Flow and leveling aid | 1 |
| Shamrock S381-N1 | Polyethylene wax | 2.5 |
| | Total | 100 |
| #3 Zahn Viscosity | 23 | |
| 60° Gloss (Paper) | 14.4 | |

The formulation was prepared as in example 2 except the low gloss additive mixture from example 1 was added to a steel container prior to all other components.

EXAMPLE 5

An Overprint Varnish Coating Formulation with a Polyamide Dispersed in Mixed Acrylates

TABLE 5

| Raw Material | Description | Parts (w/w) |
|---|---|---|
| CN-104 | Epoxy Acrylate | 20 |
| SR-454 | Ethoxylated TMPTA | 56.5 |
| Benzophenone | Photoinitiator | 8.0 |
| ORGASOL 2001 EXD | Polyamide powder | 10 |
| AMP-95 | 2-Amino-2methyl-1propanol | 2 |
| Drewfax 860 | Flow and leveling aid | 1 |
| Shamrock S381-N1 | Polyethylene wax | 2.5 |
| | Total | 100 |
| #3 Zahn Viscosity | 23 | |
| 60° Gloss (Paper) | 46 | |

The formulation was prepared as in example 4 except the Michael resin from example 1 was omitted. The performance properties of the formulations for Examples 2-5 are given in Table 6. Each of the above overprint varnish coating formulations were applied to a standard Lenata 1B chart substrate where half the chart is black and the other half bare. The formulations were applied using a number 3 Meyer rod capable of depositing 0.27 mils of wet film on the substrate. Each film was cured by exposing it to a single 600 W fusion fusion "H" bulb.

TABLE 6

| Ex. # | Additive | Photoinitiator | #3 Zahn Viscosity | 60° Gloss | Cure response |
|---|---|---|---|---|---|
| 2 | None | 5 | 18 | 94.5 | Good |
| 3 | Silica | 5 | 90 | 48 | Good |
| 4 | Low gloss additive | 2.5 | 23 | 14.4 | Good |
| 5 | Orgasol 2001EXD | 10 | 23 | 46.0 | Good |

The examples listed above illustrate the performance benefits of an overprint varnish coating formulation containing a low gloss additive comprising the combination of a polyamide and an uncured, liquid Michael addition resin.

The following examples show the use of higher levels of a Michael addition resin in the overprint varnish formulation. No photoinitiator was used in either example. Example 6 in Table 7 was prepared without a low gloss additive. Example 7 in Table 8 contains a low gloss additive.

TABLE 7

| Raw Material | Description | w/w % |
|---|---|---|
| FlexCure OPV-150 resin | 0.80HDDA/0.10 XZ92551.00/0.05TMPEOTA/ 0.05TMPTA/0.755 EAA/0.225 IR 2959 AA/3.0/0.40 (DEA + DBA) | 60.0 |
| SR-454 | PMPEOTA | 15.4 |
| SR-508 | DPGDA | 21.1 |
| Drewfax 860 | Flow and leveling aid | 1.0 |
| Shamrock S381-N1 | Polyethylene Wax | 2.5 |
| | Total | 100 |
| #3 Zahn Viscosity | 23 | |
| 60° Gloss | 94 | |

TABLE 8

| Raw Material | Description | w/w % |
|---|---|---|
| Low Gloss Additive | 58% Michael resin 30% Orgasol 2001 EXD Nat - 12% SR454 | 30.0 |
| FlexCure OPV-150 resin | 0.80HDDA/0.10 XZ92551.00/0.05TMPEOTA/ 0.05TMPTA/0.755 EAA/0.225 IR 2959 AA/3.0/0.40 (DEA + DBA) | 41.20 |
| SR-454 | TMPEOTA | 10.80 |
| SR-508 | DPGDA | 14.80 |
| Drewfax 860 | Flow and leveling aid | 0.70 |
| Shamrock S381-N1 | Polyethylene Wax | 2.5 |
| | Total | 100 |
| #3 Zahn Viscosity | 23 | |
| 60° Gloss | 31 | |

| Ex # | Additive | Photoinitiator | #3 Zahn Viscosity | 60°Gloss | Cure Response |
|---|---|---|---|---|---|
| 6 | None | None | 23 | 94 | good |
| 7 | Low gloss additive | None | 23 | 31 | good |

XZ92551 is an epoxy acrylate available from Dow.

IR2959AA is acetoacetate reacted with Irgacure® 2959 from Ciba-Geigy.

(DEA+DBA) is an approximately 1:1 mixture of diethanol amine and dibutyl amine.

We claim:

1. A low gloss, UV curable overprint varnish composition, comprising the reaction product of;
   A. a low gloss additive, comprising:
      i. a liquid Michael addition resin, comprising the reaction product of Michael donor and a Michael acceptor, and
      ii. a polyamide polymer powder, and
   B. a reactive acrylate monomer,
   wherein the overprint varnish composition has a lower gloss value as determined by ASTM 523-89 at 60° than an overprint varnish composition without the combination of the Michael addition resin and the polyamide powder.

2. The composition as claimed in claim 1, further comprising a photoinitiator.

3. The composition as claimed in claim 1, further comprising a synergist.

4. The composition as claimed in claim 1, further comprising a finish enhancer.

5. The composition as claimed in claim 1, further comprising a flow and leveling aid.

6. The composition as claimed in claim 1, wherein the Michael donor is a β-diketone, a β-ketoester, a β-ketoanilide, a β-ketoamide or mixtures thereof.

7. The composition as claimed in claim 1, wherein the Michael acceptor is an acrylate having at least two acrylate groups.

8. The composition as claimed in claim 1, wherein the polyamide powder has an average particle size of from 5 microns to 12 microns.

9. The composition as claimed in claim 1, wherein the Michael donor and/or Michael acceptor are modified to contain Type I α-cleavage or Type II H-abstraction photolabile moieties.

10. A low gloss, UV curable overprint varnish composition as claimed in claim 1 comprising;
  A. a low gloss additive, comprising
    i. from about 10 wt % to about 90 wt % of a liquid Michael addition resin,
    ii. from about 3 wt % to about 9 wt % of a polyamide polymer powder,
  B. from about 5 wt % to about 70 wt % of an acrylate,
  C. up to about 3 wt % of a photoinitiator,
  D. up to about 10 wt % of a synergist,
  E. up to about 10 wt % of a finish enhancer, and
  F. up to about 10 wt % of a flow and leveling aid.

11. A low gloss, overprint varnish coating comprising the reaction product of claim 1.

12. An article having at least one low gloss coated surface, comprising;
  A. a substrate, and
  B. a low gloss coating on at least one surface of the article, comprising the UV cured reaction product of claim 1.

* * * * *